United States Patent [19]

Wright et al.

[11] 4,232,300

[45] Nov. 4, 1980

[54] LEVEL MEASURING SYSTEM USING ADMITTANCE SENSING

[75] Inventors: William S. Wright, Dublin; Kenneth M. Loewenstern, Warminster, both of Pa.

[73] Assignee: Drexelbrook Controls, Inc., Horsham, Pa.

[21] Appl. No.: 963,299

[22] Filed: Nov. 24, 1978

[51] Int. Cl.³ .................. G08C 19/10; G01R 27/00
[52] U.S. Cl. .................. 340/840.39; 73/304 C; 324/60 C; 324/61 P; 340/840.11; 340/840.16
[58] Field of Search .... 340/177 R, 177 VA, 177 VC, 340/210, 200, 182, 618, 620, 603; 324/60 R, 60 C, 58 R, 61 P, 58.5 A, 58.5 B; 73/304 C; 307/118; 361/284

[56] References Cited

U.S. PATENT DOCUMENTS

| | | | |
|---|---|---|---|
| 2,136,900 | 11/1938 | Woolley | 340/177 R |
| 3,537,085 | 10/1970 | Mayer et al. | 340/177 R |
| 3,587,076 | 6/1971 | Grover | 340/182 |
| 3,746,975 | 7/1973 | Maltby | 324/61 R |
| 4,021,707 | 5/1977 | Ehret et al. | 361/284 |
| 4,064,753 | 12/1977 | Sun et al. | 324/61 P |
| 4,146,834 | 3/1979 | Maltby et al. | 340/177 R |

Primary Examiner—John W. Caldwell, Sr.
Assistant Examiner—James J. Groody
Attorney, Agent, or Firm—Woodcock, Washburn, Kurtz, Mackiewicz & Norris

[57] ABSTRACT

A transmitting system including an admittance sensing probe having sensing elements adapted to sense both the composition and the level of materials. The probe is coupled to admittance responsive networks forming part of a common oscillator which generate admittance signals representing the level and composition of the material. A remotely located power supply provides current to the transmitters through two pairs of lines, and the output currents of the transmitters represent the level and composition of the materials.

12 Claims, 3 Drawing Figures

LEVEL MEASURING SYSTEM USING ADMITTANCE SENSING

BACKGROUND OF THE INVENTION

This invention relates to RF admittance measuring systems for monitoring the condition of materials, and more particularly to such systems which are adapted to provide an indication of the level of materials.

In the past, so-called two-wire transmitters have been utilized to monitor the condition of materials at a remote location. Typicaly, a two-wire transmitter disposed at a remote location is connected in series relationship with a local transmitter comprising a power supply and a load through a pair of transmission wires. As the condition being monitored at the local transmitter varies, the effective series resistance across the remote transmitter varies so as to produce a change in the current flowing through the two-wire circuit. The level of the current represents, in many instances being proportional to, the condition being monitored. One of the advantages of a system of the type under discussion is the low power consumption, since the amount of power which is available to the local transmitters may be limited. In addition, certain applications require that the local transmitters be "intrinsically safe" so as to permit its use in monitoring conditions in an explosive environment. Under such circumstances, the low energy level which is associated with low power consumption becomes important in precluding the possibility of ignition and explosion.

Although the state of the art in two-wire transmitters is adequate for monitoring many types of conditions, nonetheless there are deficiencies in prior art RF admittance measuring systems. In particular, it will be recognized that the electrical parameters of the material to be measured are intrinsically part of the measurement system with RF measurement devices. Hence, different types of materials will provide different signal characteristics, requiring recalibration of the transmitting apparatus when different materials are to be measured. In any environment where the material remains the same, only its level varying, an initial calibration of the system should suffice. However, in some applications the composition of material whose level is to be monitored varies from time to time, necessitating calibration or readjustment of the system each time the composition varies.

According to copending application Ser. No. 963,300 filed Nov. 24, 1978, assigned to the assignee of this invention, a probe may be provided which embodies a pair of sensing elements; one for sensing the level of material in a vessel, and a second for sensing the composition thereof. In each case, the sensing element produces a change in the apparent admittance of the probe and an admittance-related signal is derived for producing an indication of both the level and the composition of the material. Once such signals are derived it is possible to use the composition-related signal to modify or compensate the level-related signal, so as to provide a signal reflecting the compensated level of the material despite changes in its composition and/or insulation from time to time.

Certain problems inhere in the above approach. For instance, both the composition and the level-related admittance signal must be detected, processed and combined, and to the extent that two separate two-wire transmitters are required, difficulties may be encountered in maintaining the amplitude and phasing of the transmitters within sufficiently close tolerance to permit accurate and low cost measuring.

SUMMARY OF THE INVENTION

It is an object of this invention to provide a two-wire transmission system which is capable of transmitting two different but related signals from a remote location to another location while permitting the related signals to be accurately combined to obtain the desired information.

It is a more specific object of this invention to provide a two-wire transmission system which is capable of determining the level of a material at a remote location independent of the nature of the composition of that material and/or changes in the sensing element insulating and to do so with a high degree of accuracy.

It is another object of this invention to provide such a two-wire transmission system wherein the circuitry at the remote or process location is characterized by low power and low current and the high power and high current circuitry is at the other location so as to render the system intrinsically safe.

It is another object of this invention to provide such a two-wire transmission system which is capable of use with a wide range of probe cable lengths.

It is a further object of this invention to provide such a two-wire system which is relatively low cost.

It is also an object of this invention to provide such a two-wire transmission system which is compatible with existing standards and standard systems.

It is a further object of this invention to provide such a two-wire system in combination with a probe which is capable of ignoring coatings on the probe.

It is a still further object of this invention to provide such a two-wire transmission system which is capable of use with a probe adaptable to variations in material tank or vessel sizes.

It is also an object of this invention to provide such a two-wire transmission system which may be utilized with a probe adaptable for use in existing systems.

It is also an object of this invention to provide such a two-wire transmission system which may be utilized with a probe which may be inserted into a material tank or vessel with a single entry.

It is also an object of this invention to provide such a two-wire transmission system which may be utilized with a sensing element or probe which is capable of measuring close to the bottom of a tank or vessel.

It is a further object of this invention to provide such a two-wire transmission system which may be used with a probe of simple design.

It is a further object of this invention to provide such a two-wire transmission system which may be used with a probe adaptable to measure the level of slurries.

It is a still further object of this invention to provide a two-wire transmission system which may be easily calibrated and is also capable of precalibration.

In accordance with these and other objects, the preferred embodiment of the invention comprises a power supply and the load at one location and two-wire transmitter means at another location interconnected by two pairs of transmission lines carrying a variable signaling current. The transmitter means which comprises an admittance sensing means including a first admittance sensing element and a second admittance sensing element. A first admittance sensing network including an admittance associated with the first admittance sensing element and a second admittance sensing network including the admittance associated with the second admittance sensing element are part of a common oscillator. Output means are coupled to the first and the second admittance sensing networks for varying the signaling current in the pairs of transmission lines in response to the admittance sensed by the first sensing element and the second sensing element.

In a particularly preferred embodiment of the invention, the first admittance sensing element senses an admittance characteristic of the level of the material and the second admittance sensing element senses an admittance characteristic of the composition of the material.

Preferably, the first admittance sensing network includes a first admittance measured between the first sensing element and ground and the second admittance sensing network includes a second admittance measured between the second sensing element and ground. A guard element may be disposed physically between the first sensing element and the second sensing element and driven at substantially the same potential when measuring the level and composition. Insulation may be associated with the first sensing element and the second element so as to separate the first and the second element from the material where the thickness and dielectric constant of the insulation at the first sensing element and the second sensing element are substantially equal. Preferably, the first admittance sensing network and the second admittance sensing network include first and second bridges where the admittance between the first sensing element and ground and the admittance between the second sensing element and ground are incorporated in the first and second bridges respectively.

In accordance with another important aspect of the invention, the two-wire transmission means includes first and second power supplies coupled to the common oscillator. The power supplies are individually adjustable.

In accordance with still another important aspect of the invention, the transmitter system includes means at the location of the load for combining the signaling current on each of the first and second pairs of transmission lines so as to generate a signal reflecting the level corrected for changes in composition and/or insulation.

In a preferred embodiment, the combining of the signaling current is achieved by dividing signaling current from one of the pairs representing level by signaling current from the other of the pairs representing composition.

BREIF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

DESCRIPTION OF A PREFERRED EMBODIMENT

Figure 1:
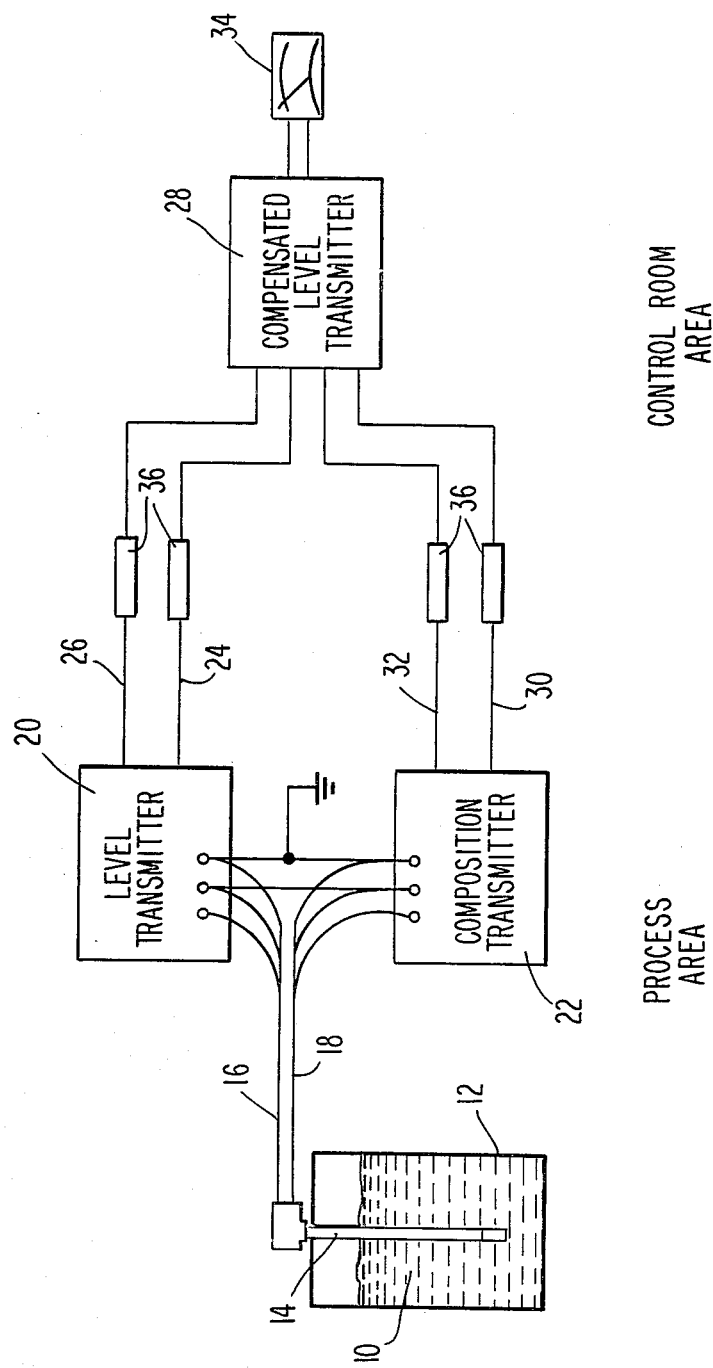
FIG. 1 is a block diagram illustrating the relative arrangement of system elements.

In FIG. 1, a material 10 whose actual or compensated level is to be detected is disposed in a vessel 12. A probe generally indicated at 14 extends into the vessel and makes contact with the material. A pair of shielded cables 16 and 18 extends from the head of the probe to a pair of local transmitters 20 and 22. Transmitter 20 produces an output signal representing the uncorrected condition or level of the material in the vessel, while composition or compensating transmitter 22 produces an output signal which reflects the nature of the composition of the material.

Each of the transmitters 20 and 22 is of the type regarded as a "two-wire" transmitter. Transmitter 20 is supplied with current through a pair of wires 24 and 26. These wires extend to a remotely-located transmitters 28, herein denoted a compensated level transmitter. In like manner, a pair of wires 30 and 32 provides a circuit through which current may flow compensated level transmitter 28 to composition transmitter 22. The output signal from compensated level transmitter 28 is applied to an output stage 34 which may be a meter providing a visual indication of the level of the material in the vessel.

As will be appreciated by those skilled in the art, the local transmitter 20 and 22 are conventionally spaced at some distance from probe 14, but are ordinarily in the same general environment as vessel 12 which may be described as the process area. The distance to the compensated level transmitter 28 is conventionally much greater than the distance between the probe and local transmitters, hence the terms "local" and "remote". When the process area about vessel 12 is considered to be a hazardous area, as for instance may occur when the material being monitored is highly flammable or explosive, intrinsic safety barriers 36 may be used to separate the local and remote transmitter elements.

Each of the transmitters 20 and 22 are adapted to draw a signal current which represents an unknown measured admittance, representing the condition of materials sensed by the level and composition sensing elements of the probe 14, respectively. Accordingly the measured admittance, which includes the level element of the probe 14 causes the level transmitter 20 to draw a current (ordinarily in the range of from 4 to 20 milliamps) which is representative of the level of the material in the vessel 12. By restricting the current flow to such low levels, an intrinsically safe system is produced, suitable for use in hazardous environments.

In like manner, the admittance of the composition sensing element of the probe 14 is sensed by composition transmitter 22, and reflected in the level of current flowing in wires 30 and 32, also in the range of from 4 to 20 milliamps. The compensated level transmitters 28 responds to the current level in the two sets of wires, modifying the level signal from transmitter 20 in view of the value of the composition signal from the second transmitter 22 to generate a corrected or compensated level supplied to a display device 34.

Figure 2:
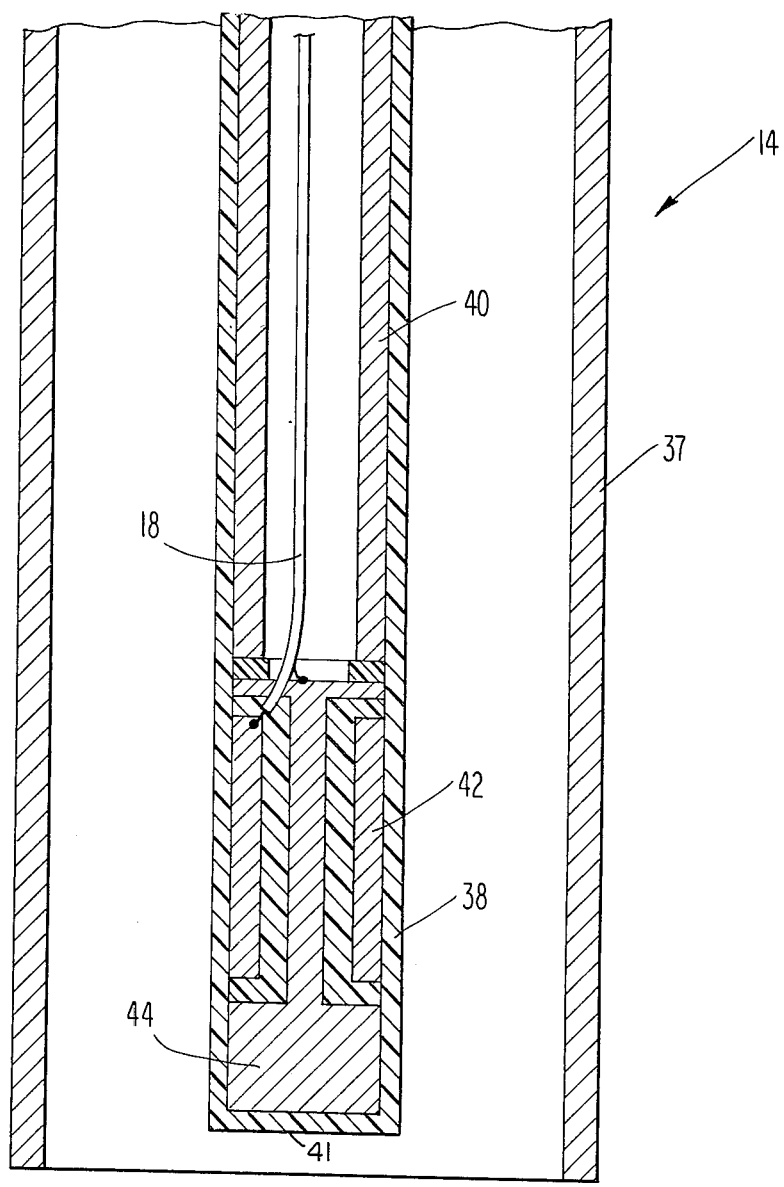
FIG. 2 illustrates the construction of a probe having sensing elements suitable for use with the present invention.

Turning now to FIG. 2, there is shown in idealized form the construction of a probe suitable for use with the present invention. The probe 14 is covered with an insulating material 38. A cylindrical and concentric level-sensing element 40 extends along a portion of the probe 14 beneath the insulation 38 and is terminated at one end by insulation 41. Note that the insulation is of uniform or equal thickness at the elements 40 and 42 and the dielectric constant also remains equal. The level sensing element 40 is coupled to the central conductor of the coaxial cable 18 which extends to the level transmitter. In like manner, a second sensing element 42 for sensing the composition of a material is provided which is advantageously disposed near the bottom of the probe so as to permit measurements close to the bottom of the vessel 12 as shown in FIG. 1. A driven guard or shield 44 extends to the end of the probe 14 so as to substantially limit the effects of stray capacitance between the bottom of the vessel 12 and the second element 42. The shield 44 also extends outwardly between the sensing element 40 and the sensing element 42 to avoid the effects of stray capacitance between the sensing element 40 and 42 as well as the effects of coatings. A concentric shield 37 which is maintained at ground may be utilized to create equal spacing or the same geometry for the sensing elements 40 and 42 with respect to ground regardless of vessel configuration so as to permit replacement in existing vessels, adaptation to various tank sizes and ease of calibration and/or precalibration. However, it will also be appreciated that the shield 37 may be eliminated or replaced by a cage-like member of similar configuration.

While the construction and operation of the probe depicted in FIG. 2 is set forth in further detail in copending patent application Ser. No. 963,300 filed Nov. 24, 1978 is incorporated herein by reference, it will be recognized by those skilled in the art that the admittance encountered by the various sensing elements varies as a function of the type and amount of material surrounding the probe. By placing composition sensing element 42 near the lowermost end of the probe, the sensing element 42 which is short relative to the element 40 will be in contact with the material as long as the level of the material is high enough to be measured by the upper, level-sensing element 40 thereby permitting level measurements close to the bottom of the vessel.

Figure 3:
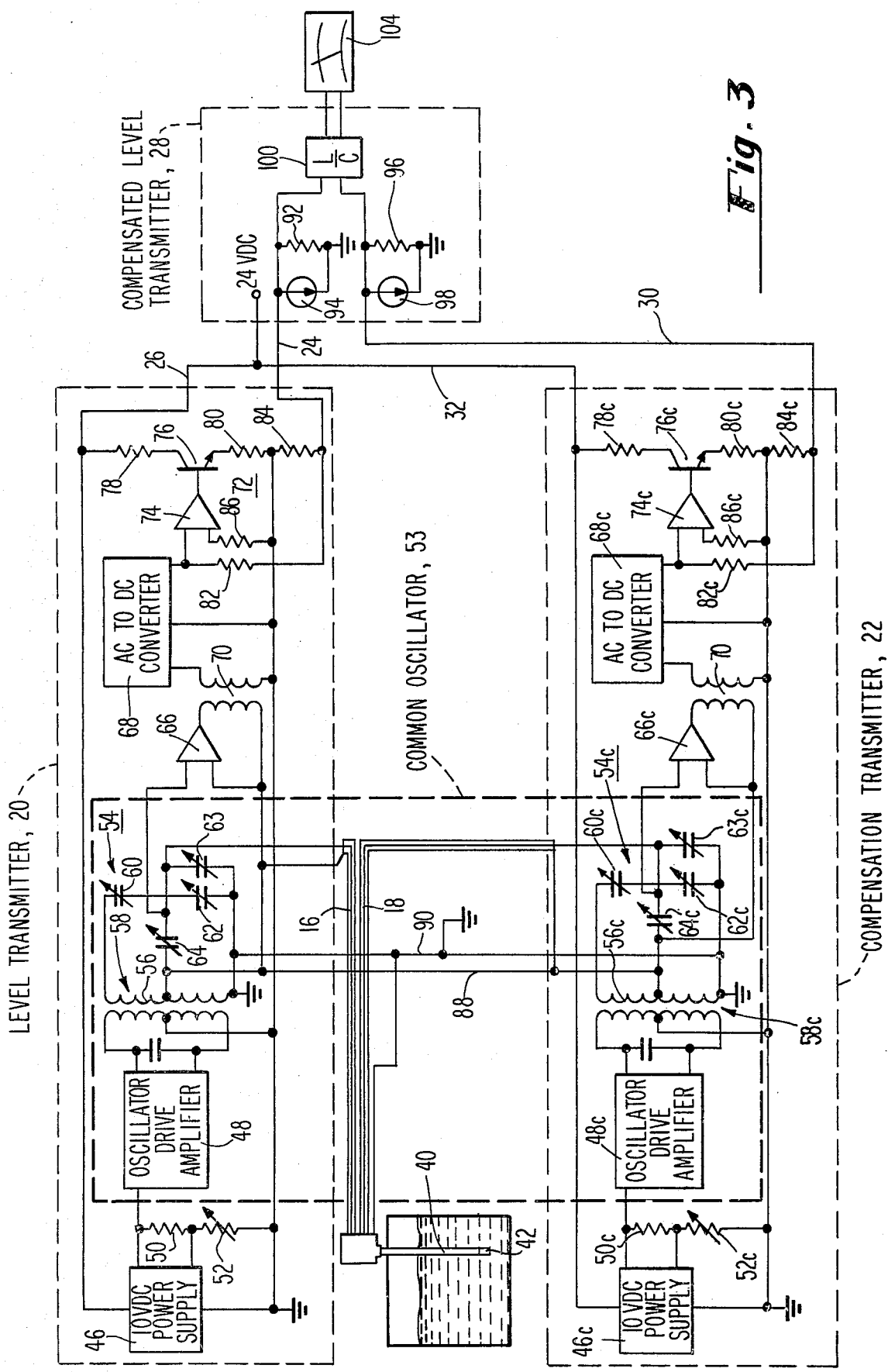
FIG. 3 is a schematic diagram of a preferred embodiment of the invention.

The manner of connection of the various elements of cables 16 and 18 and the circuitry at the various transmitters is shown in detail in FIG. 3. Each of the local transmitters 20 and 22 advantageously comprise similar electronic circuitry, and may in fact be identical units which are incorporated herein by reference. Inasmuch as in a preferred embodiment the level and composition transmitters are identical, only level transmitter 20 will be described in detail, and similar reference characters followed by the letter c will designate comparable components in the transmitter 22.

A 10 volt DC power supply 46 supplies an oscillator drive amplifier 48. A pair of resistors 50 and 52 provide means for determining the voltage to the oscillator drive 48.

In accordance with this invention, a single oscillator 53 is common to both transmitters 20 and 22 so as to have a common resonant frequency so as to avoid the effects of amplitude, phase and frequency variations between the transmitter and to also permit the use of a single or common shield means. The oscillator 53 is supplied in part by the drive amplifier 48 of the transmitter 20 and a similar amplifier 48c in the transmitter 22. A common power supply may be used for the level and composition transmitters 20 and 22 although it is preferred that the separate voltage adjustment capability as shown be provided for each transmitter so that independent trimming of each oscillator drive may take place. This feature is desirable since it allows the drives 48 and 48c of the transmitters to be adjusted and thereby disproportionately drive the common oscillator 53 thus avoiding any power shortage when, for example, the level transmitter is signaling 4 milliamps or low material level.

The oscillator drive 48 is coupled to an admittance sensing network generally indicated at 54 which comprises a bridge network connected to the secondary winding 56 of the transformer 58 which forms part of the oscillator 53 along with the admittance sensing network 54c. The sensing network includes a zero capacitor 60 and a probe capacitor 62 (from the level sensing element to ground) coupled in series across the secondary winding 56. A fine zero capacitor 63 is connected in parallel with the probe capacitor 62. An adjustable span capacitor 64 connects the intersection of capacitors 60 and 62 to a tap intermediate the ends of the secondary winding 56. In order to minimize linearity errors, a high ratio of the span capacitance to the change in probe capacitance for full scale measurement is maintained.

An error signal amplifier 66 is connected directly across the span capacitor 64 so as to produce a signal having a level reflecting the admittance from the level sensing element of the probe 14 to ground. The output from the amplifier 56 is coupled to an AC to DC converter 68 through a transformer 70. A voltage to current amplifier 72 comprises an operational amplifier 74 and a transistor 76 is connected to the output of the converter 68. The bias resistors 78 and 80 connect the collector and emitter of the transistor 76 to the power supply 46. Resistors 82 and 84 are connected from one input terminal of the operational amplifier 74 and the resistor 78 to the transmission line 24. A resistor 86 is connected between the other input terminal of the operational amplifier 74 and circuit common. The central and shield members of coaxial cable 16 are coupled to the sensing element 40 and shield member 44 shown in FIG. 2, respectively, of the level sensing portion of probe 14.

As the admittance sensed by the level sensing element 40 changes, the admittance is detected by the error amplifier 66. Accordingly, as the level of material 10 changes, the effective admittance of sensing circuit 54 varies, ultimately resulting in a change in the level of current flowing through wires 24 and 26.

The composition transmitter 22 is coupled to the composition element 42 of the probe 14 in the same manner as the level transmitter 20 is coupled to the level sensing element 40 of the probe. Accordingly, the central and shield elements of cable 18 are connected to the composition element 42 and the shield 44 of the probe respectively. It has been found that the level and composition signals produced by the transmitters 20 and 22 may be susceptible to interference and to spurious effects such as harmonic or beat frequencies resulting from a lack of synchronism between the two local transmitters. Accordingly, in accordance with this invention, the shield members of cables 16 and 18 are coupled together, or equivalently, the points on the admittance sensing circuits to which the shields are connected are electrically coupled by a connection 88 to the center tap of the secondary 56 so as to drive the shield 44 at the same potential as the sensing element 40. In like manner, the present invention contemplates that a common ground between the admittance sensing networks are connected by a conductor 90. The conductor 90 also extends to ground at the probe 14.

Within the remote compensated level transmitter 28, level and composition signals are received and operated upon to provide an output signal representing the actual or compensated level of the material 10 within the vessel 12. A first load resistor 92 is coupled between wire 94 and a reference potential, i.e., ground. The other wire 26 of the pair of wires supplying level transmitter 20 is coupled to a source of potential herein indicated as a 24 volt DC power supply. In this manner, load resistor 92 serves to complete a circuit through which current flows from the power supply through the level transmitter 20, and to ground. The current through the resistor 92 varies from 0 to 16 ma. while a constant current source 94 in parallel with the resistor 92 provides a current of 4 ma.

In a like manner, a second load resistor 96 is coupled between wire 30 and ground. The other wire 32 connects the transmitter 22 with the 24 volt DC supply which is the same source as is used to supply current to level transmitter 20. The current through the resistor 96 varies 0 to 16 ma. so as to indicate composition while a constant current source 98 in parallel with the resistor 96 provides a current of 4 ma.

A processing network 100 receives signals representing both the uncorrected level and the composition of the material 10. The level signal is corrected in accordance with the composition signal, for instance by dividing the level signal by a value derived from the composition signal. The specifics of the network 100 form no part of the present invention, and the network may be constituted by any of the various well-known divider circuits commonly used for dividing one signal by another.

The resulting corrected or compensated level signal is applied to an output device 104 which is depicted in FIG. 3 as a 4-20 milliamp meter. It should be recognized, however, that other means may be provided for receiving the compensated level signal and displaying or recording the same, or applying the signal to other equipment.

In operation, DC power supplies 46 and 46c are energized, initiating operation of the oscillators connected thereto. Resistors 52 and 52c may be adjusted to trim the oscillator drives 48 and 48c so as to avoid loading which would otherwise require the level transmitter to draw more than 4 ma. with the material level below the sensing element 40. Because of the position of the composition sensing element 42 at the lowermost end of the probe 14, material 10 will always cover the composition sensing element 42. Accordingly, a disproportionate amount of power from the composition transmitter may be used to supply the bridges and common oscillator. The admittance sensed by the composition sensing element 42 causes a signal to be applied to the error amplifier 66c and the amplifier 72c which determines the amount of current drawn by the composition transmitter 22. A signal reflecting this value then arises across load resistor 96 and is applied to the divider 100.

As the material 10 rises within vessel 12, it encounters the level sensing element 40 of the probe 14 and changes the sensed admittance. A signal representing the admittance is applied to the detector 66 and the amplifier 72 which determines the amount of current drawn by the level transmitter. In this manner, the signal across the load resistor 92 is caused to vary in accordance with the level sensed, and the resulting signal is applied to the divider circuit 100.

In a presently preferred embodiment, the divider circuit 100 continuously operates on the level signal derived from the level transmitter 20, dividing it by a signal reflecting the composition of the material which also reflects the geometry of container 12. The resulting compensated level output signal is then displayed by the meter 84 and to denote the accurate or compensated level of the material in vessel 12.

It will therefore be seen that the present invention provides an output signal which is proportional to the level of material in a given container, regardless of the specific material therein. Thus, a container may be filled with different materials which exhibit markedly different admittances, without the need for successive recalibration of a system. Moreover, unnoticed changes in the composition of a material will not serve to provide an erroneous level signal, but rather are automatically compensated for by the composition signal from transmitter 22. At the same time, only a single entry into the vessel 12 need be made in order to accommodate the single probe 14. Accordingly, exisiting level systems may be replaced without modifying the vessel. In addition, the illustrated system automatically compensates for changes in the characteristics of probe insulation, and corrects for geometry mismatches between the level and composition elements. The system maintains the highly desirable attributes of separate, i.e., local and remote, transmitters, and accepts conventional two-wire signal inputs. Moreover, correction for irregular geometries of composition-containing vessels may be made automatically so that errors due to irregularly-shaped vessels may be readily overcome.

For further details relating to the transmitters 20 and 22 cables 16 and 18, reference is made to copending application Ser. No. 743,618, filed Nov. 22, 1976 now U.S. Pat. No. 4,146,834, which is incorporated herein by reference.

The phrase "level or condition measuring" electrode has been utilized herein to denote an electrode capable of measuring the level of material uncorrected or uncompensated for changes, for example, in material such as density or dielectric constant as well as changes in the dielectric constant of the probel insulation. The phrase "composition measuring or compensating" electrode has been utilized herein to denote an electrode capable of measuring various changes, for example, in material density or dielectric constant as well as changes in the dielectric constant of the probe insulation.

In the embodiment shown, the shield means associated witn and located between the electrodes 10 and 12 are maintained at the same potential. However, it will be understood that the shield means may be driven at different potentials. It will also be understood that the sensing networks 54 and 54c may be incorporated in separate or the same bridge to achieve the objective of a common oscillator.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed is:

1. In a transmitter system comprising a power supply and a load at one location and two-wire transmitter means at another location interconnected by two pairs of transmission lines carrying a variable signaling current; said transmitter means comprising:

an admittance sensing means including a first condition sensing element for sensing an admittance characteristic of material corresponding to the level or condition thereof and a second compensating sensing element for sensing an admittance characteristic of the composition of said material;

a single oscillator;

a first admittance sensing network coupled to said first sensing element and said oscillator;

a second admittance sensing network coupled to said second sensing element and said oscillator; and output means coupled to said first and said second admittance sensing networks for varying the signaling current in each of said pairs of transmission lines in response to the condition and composition of said material respectively.

2. A transmitter according to claim 1 wherein said first sensing network includes a first admittance measured between said first sensing element and ground and said second admittance sensing network includes a second admittance measured between said second sensing element and ground.

3. A transmitter system according to claim 2 wherein said first admittance sensing network and said second admittance sensing network include a guard element disposed between said first sensing element and said second sensing element and driven at substantially the same potential.

4. A transmitter system according to claim 1 wherein said first admittance sensing network includes insulation separating said first sensing element from said material and said second sensing element from said material, the thickness and dielectric constant of said insulation at said first sensing element and said second sensing element being substantially equal.

5. A transmitter system according to claim 4 wherein said first admittance sensing network includes a first bridge and said second admittance sensing network includes a second bridge, said first bridge and said second bridge forming part of said oscillator.

6. A transmitter system according to claim 1 further including first and second power supplies coupled to said oscillator.

7. A transmitter system according to claim 6 wherein said power supplies are individually adjustable.

8. A transmitter system according to claim 1 further including means at said one location for combining said signaling current from said pairs of transmission lines so as to generate a signal reflecting the condition corrected for changes in composition.

9. A transmitter system according to claim 8 wherein said means at said one location comprises means for dividing signaling current from one of said pairs by signaling current from the other of said pairs.

10. A transmitter system comprising a power supply and a load at one location and two-wire transmitter means at another location interconnected by two pairs of transmission lines carrying a variable signaling current, said transmitter means comprising:

an admittance sensing means including a first admittance sensing element and a second admittance sensing element;

a single oscillator including, a first admittance sensing network including admittance associated with said first sensing element;

a second admittance sensing network including admittance associated with said second sensing element; and output means coupled to said first and said second admittance sensing networks for varying the signaling current in each of said pairs of transmission lines in response to the admittance sensed by said first sensing element and said second sensing element.

11. In a transmitter system comprising a power supply and a load at one location and transmitter means at another location interconnected by a plurality of transmission lines carrying signals; said transmitter means comprising:

an admittance sensing means including a first condition sensing element for sensing an admittance characteristic of material corresponding to the level or condition thereof and a second compensating sensing element for sensing an admittance characteristic of the composition of said material;

a single oscillator;

a first admittance sensing network coupled to said first sensing element and said oscillator;

a second admittance sensing network coupled to said second sensing element and said oscillator; and output means coupled to said first and said second admittance sensing networks for varying the signals in said plurality of transmission lines in response to the condition and composition of said material respectively.

12. A transmitter system according to claim 11 further including means at said one location for combining said signals from said plurality of transmission lines so as to generate a signal reflecting the condition corrected for changes in dielectric constant of the composition.

* * * * *